United States Patent [19]

Hemsath

[11] Patent Number: 4,913,065
[45] Date of Patent: Apr. 3, 1990

[54] IN SITU THERMAL WASTE DISPOSAL SYSTEM

[75] Inventor: Klaus H. Hemsath, Toledo, Ohio

[73] Assignee: Indugas, Inc., Toledo, Ohio

[21] Appl. No.: 329,423

[22] Filed: Mar. 27, 1989

[51] Int. Cl.⁴ ............................................. F23D 3/00
[52] U.S. Cl. ................................... 110/239; 110/241; 110/242; 126/271.3
[58] Field of Search .................. 110/239, 241, 242; 126/271.3; 432/209

[56] References Cited

U.S. PATENT DOCUMENTS

| | | | |
|---|---|---|---|
| 1,066,535 | 7/1913 | Ross | 110/239 |
| 1,347,054 | 7/1920 | Paxton | 110/239 |
| 1,436,053 | 11/1922 | Phillips | 110/239 |
| 3,946,719 | 3/1976 | Bark et al. | 126/92 AC |
| 4,140,482 | 2/1979 | Simon | 432/209 |
| 4,162,654 | 7/1979 | Spitz et al. | 110/241 |
| 4,214,866 | 7/1980 | Thekdi et al. | 432/12 |
| 4,253,406 | 3/1981 | Spitz et al. | 110/241 |
| 4,373,903 | 2/1983 | Wunning | 432/209 |
| 4,787,844 | 11/1988 | Hemsath | 432/242 |
| 4,799,878 | 1/1989 | Schaeffer | 431/202 |

Primary Examiner—Henry C. Yuen
Attorney, Agent, or Firm—Body, Vickers & Daniels

[57] ABSTRACT

An in situ system for thermally cleansing hazardous and toxic waste disposal sites is disclosed. The system includes a perimeter wall extending into the site which is sealed to a roof structure surrounding the site to encapsulate the site. A plurality of tubes are sunk into the encapsulated site in a geometric pattern and are directly heated to indirectly heat the site. In time, the temperature of the entire site is raised to a level where the waste is volatilized and the volatiles are collected in the roof and subsequently incinerated.

26 Claims, 7 Drawing Sheets

IN SITU THERMAL WASTE DISPOSAL SYSTEM

This invention relates generally to a thermal cleaning system (method and apparatus) for treating toxic and/or hazardous wastes and more particularly to an in situ system for cleaning soils and sites contaminated with hazardous or toxic waste.

The invention is particularly applicable to a thermal in situ system which uses a gas fired arrangement for heating the site and will be described with particular reference thereto. However, it will be appreciated by those skilled in the art that, in theory, other methods of generating heat could be applied to the system.

INCORPORATION BY REFERENCE

The following patents are incorporated by reference herein:

(a) U.S. Pat. No. 4,787,844 dated Nov. 4, 1988;
(b) U.S. Pat. No. 4,214,869 dated July 29, 1984.

BACKGROUND

The cleaning up of sites contaminated with hazardous or toxic waste has been recognized for some time as a major national environmental problem. There are, of course, many different conceptual approaches which have been attempted with varying degrees of success to clean such sites. One concept which has been successfully employed in the treatment of hazardous and/or toxic waste is to thermally clean such waste such as by pyrolysis and/or incineration. In fact, thermal methods are the only ways to dispose of certain wastes, such as chemical munitions, permanently.

Presently, the only successful thermal approach for cleaning a contaminated site has been to physically remove the soil from the site and truck the contaminated soil to a waste disposal site. At the waste disposal site, the soil is heated at elevated temperature and the contaminants within the soil are volatilized and then incinerated. Incineration processes and related equipment have been patterned closely after industrial equipment that has been developed for steam raising, cement making, heat treating and/or processing. Essentially, all such systems comprise either a rotary kiln where the soil is continuously fed by means of an archimedes screw through a cylinder which may be inclined or, alternatively, through a vertical shaft furnace or an inclined shaft furnace in which the soil is heated as a moving or fluidized bed as it falls by gravity through the furnace. All of these incineration processes combine continuous material handling, high temperature heating of materials, combustion of organic contaminants and cleaning of the resulting waste gas comprising distilled organics, etc. All such processes and equipment are designed based on the experiences and design guidelines used for heating of industrial materials which are, in most cases, consistent in size, shape and composition. Contaminated wastes, especially those generated over a long period of time by landfills or waste dumping from many different sources, are inconsistent in composition, size, shape and chemical make-up. Under these conditions, it becomes very difficult to design and operate a waste disposal system on a continuous, reliable and safe basis. In most instances, the disposal plant design requires substantial investment and equipment for sizing and controlled feeding of waste materials. However, decontamination of soils, of lagooned waste, of drums filled with hazardous waste and of bulky materials like contaminated tanks or other process equipment, present unique problems which render the cleansing of such matter not only difficult but in many instances impossible, at least on a commercial basis. This occurs not only because of inconsistencies in the feed, but also because certain "exotic" types of waste develop various chemical reactions which result in explosive mixtures that cannot be thermally disposed of by such continuous processes, at least not at the present time.

In such instances, the material must be segregated into small batches which are then heated within a box furnace in a closely controlled manner to distill or volatilize the organics (which are then subsequently incinerated) in a controlled process conventionally known in the trade as pyrolysis. Batch treatment of soils and non-pumpable sludges from contaminated waste sites is an expensive and impractical solution to the problem of cleansing such sites.

Contaminated soil and large lagoons, in theory, can best be treated by leaving the soil or the sludges in place, i.e. an in situ thermal cleaning system. There are no such systems at present. It is known that activity is being conducted by the Batelle Institute on an in situ thermal cleaning system which positions in the soil of the site a cathode and an anode. An electrical current is used to heat a plate in the soil interposed between the cathode and the anode which in turn is used to heat the soil and in the process thereof volatilize the organic material. However, there appear to be fundamental deficiencies in a cathode-anode arrangement, principally because the soil density is not uniform, for example the presence of rocks, boulders and the like as well as buried drums of waste etc., the non-uniform density of the site affects the ability of the cathode/anode to heat the plate. In addition, there may be inherent problems in generating sufficient heat from such an arrangement to sufficiently heat the site to its periphery.

SUMMARY OF THE INVENTION

Accordingly, it is a principal object of the invention to provide an in situ system which thermally cleanses from a site, soil, sludges and the like contaminated with toxic and/or hazardous waste material.

This object along with other features of the invention is achieved in an in situ system which generally comprises a thermal barrier extending into the soil of the site about the perimeter of the site to prevent substantial heat exchange with the soil adjacent to the site and a roof extending above the site preventing atmosphere communication with the site. The roof and the perimeter barrier, in effect, encapsulate the site to insure the system operates in a safe manner without threatening the environment. An arrangement is provided for heating the soil at the site to a temperature whereat the contaminants in the soil are volatilized and an afterburner associated with the roof acts to collect and incinerate the volatilized contaminants as they leave the site. Specifically, the heating arrangement includes a plurality of radiant heat type tubes extending into the soil at the site and spaced apart from one another at predetermined distances and depths. A burner arrangement for each tube mixes combustion air and a combustible gas and the tube indirectly heats the soil at the site from the products of combustion within the tube. The indirect heating of the soil inherently results in all the soil in the site being raised to the same temperature as a function of time, to assure volatilization of all the contaminants within the site.

In accordance with a specific feature of the invention, each of the tubular members is positioned within a hole prepared in the soil of the site and a bed of solid particulates is positioned between the periphery of the hole and the tubular member therein and in part provides a path for the escape of some of the volatiles. The tubular member includes an outer casing having an open end generally above the site and to which the burner block is secured. An open ended inner tubular member concentric with and inside the outer casing defines an elongated passageway therebetween. In one embodiment, the outer casing includes a closed end opposite the open end positioned within the soil and the products of combustion exit the inner tubular member adjacent the closed end of the casing and in turn exit the casing adjacent its open end by travelling through the elongated passageway. In another embodiment, the casing is open at both ends and at least a portion of the products of combustion pass through the bed of particulates to enhance or speed up conduction heating of the soil. In both arrangements, the soil at the site is initially heated at the highest tube temperature adjacent the bottom of each tube. The conduction heat pattern propagates uniformly in all directions from the tube bottom as a function of time. The process is thus easily controlled by means of thermocouples adjacent the soil surface which insure that the entire site is heated to the appropriate temperature notwithstanding the inherent variations in densities or reactivity differences of any volumetric portions within the site.

In accordance with another important feature of the invention, the radiant tubes are positioned in a geometrically repeating pattern which permit any site, irrespective of its size, to be thermally cleansed by simply providing a sufficient number of tubular heating members. More specifically, centers of the tubular members are spaced either in a triangular or rectangular array and the position of the thermocouples with respect to each array not only permit tube temperature variation within the array for fuel saving purposes but also, and importantly so, to control by the thermocouples the chemical reaction occurring within the array. Because of the encapsulated nature of the system and the inherent effects of the soil surrounding the contaminants, volumetric portions of the site encompassed by the geometric array permit any specific portion of the site to be pyrolyzed (not incinerated) at a thermal rate different than other site portions to thus permit any particular given site to be entirely volatilized, notwithstanding sensitivity of certain wastes at various portions of the site to be thermally cleansed. In connection with this particular feature of the invention, it is to be appreciated that soil is not a good thermal conductor, that indirectly heating the soil by the arrangement described results in a very low heat rate which tends to avoid "runaway" of the wastes which might otherwise occur, and that even with the low thermal rates of the system, variation of thermal rates for selected volumetric site portions is necessary to obtain control of the sites.

In accordance with another specific feature of the invention, the perimeter barrier includes an elongated relatively thin metal member extending into the soil of the site a fixed distance and shaped in a modular manner to be joined with other segments to peripherally encompass the site. The perimeter barrier has a flanged end extending above the soil for a fixed distance and an elastomer seal is affixed to the flanged end for sealing the flanged end with the roof. A cooling arrangement is provided adjacent the elastomer seal on the flanged end to maintain the flange at a cooled ambient temperature. A cold block of insulation is placed in line contact with the side of the perimeter metal facing away from the site and extends from the flanged end into the soil a fixed distance and a hot block of insulation extends generally adjacent the flanged end into the soil a predetermined distance and is spaced a slight distance away from the metal on the opposite side of the perimeter member facing the site. This arrangement permits the metal perimeter member to thermally distort as it receives heat from the site over its length which extends beyond the cold insulating block while establishing a temperature gradient between the two insulating blocks to prevent perimeter member from rupturing because of the thermal shock which it otherwise would receive when the cold flange was subjected to the site heat. Similarly, the roof is provided with a flanged base formed in modular sections which is in sealing contact with the elastomer on the perimeter flange to effectively seal the perimeter barrier with the roof. The insulating block concept is also used to define the seal arrangement where the radiant tube extends through the roof to permit the roof to be constructed of relatively thin gauge metal. This, in turn, permits the entire system to be constructed on a modular principle, using perimeter wall sections, roof sections and individual heating tube arrangements.

It is thus another object of the invention to provide an in situ method and apparatus for thermal cleaning of hazardous and toxic waste sites which assures that the entire site is thermally cleansed and which assures the entire site is thermally cleansed in a safe operating manner.

It is yet another object of the invention to provide an in situ thermal cleaning arrangement which can be controlled with a minimum of instruments.

It is yet another object of the invention to provide an in situ thermal cleaning system which can vary the heat imparted to select volumetric portions of the site to control the reactions occurring at the site portions.

Yet another object of the invention is to provide an in situ thermal cleaning system which pyrolyzes the contaminants at the site.

A still further object of the invention is to provide an in situ thermal cleaning system for toxic and/or hazardous waste sites which can thermally clean the site by processing costs significantly less than the fuel required to process the site soil in rotary kilns, shaft furnaces and the like.

Still yet another object of the invention is to provide an in situ thermal cleansing system which can be modularly constructed so that any size of a hazardous and/or toxic waste site can be thermally cleansed.

It is another object of the invention to provide a thermal system which can cleanse, in situ, a site contaminated with tanks, drums and the like of hazardous and/or toxic waste.

These and other objects of the invention will become apparent to those skilled in the art upon reading and understanding of the detailed description which follows.

BRIEF DESCRIPTION OF THE DRAWINGS

The invention may take physical form in certain parts and arrangements of parts, a preferred embodiment of which will be described in detail and illustrated in the accompanying drawings which form a part hereof and wherein.

DETAILED DESCRIPTION OF THE PREFERRED EMBODIMENT

Figure 1:
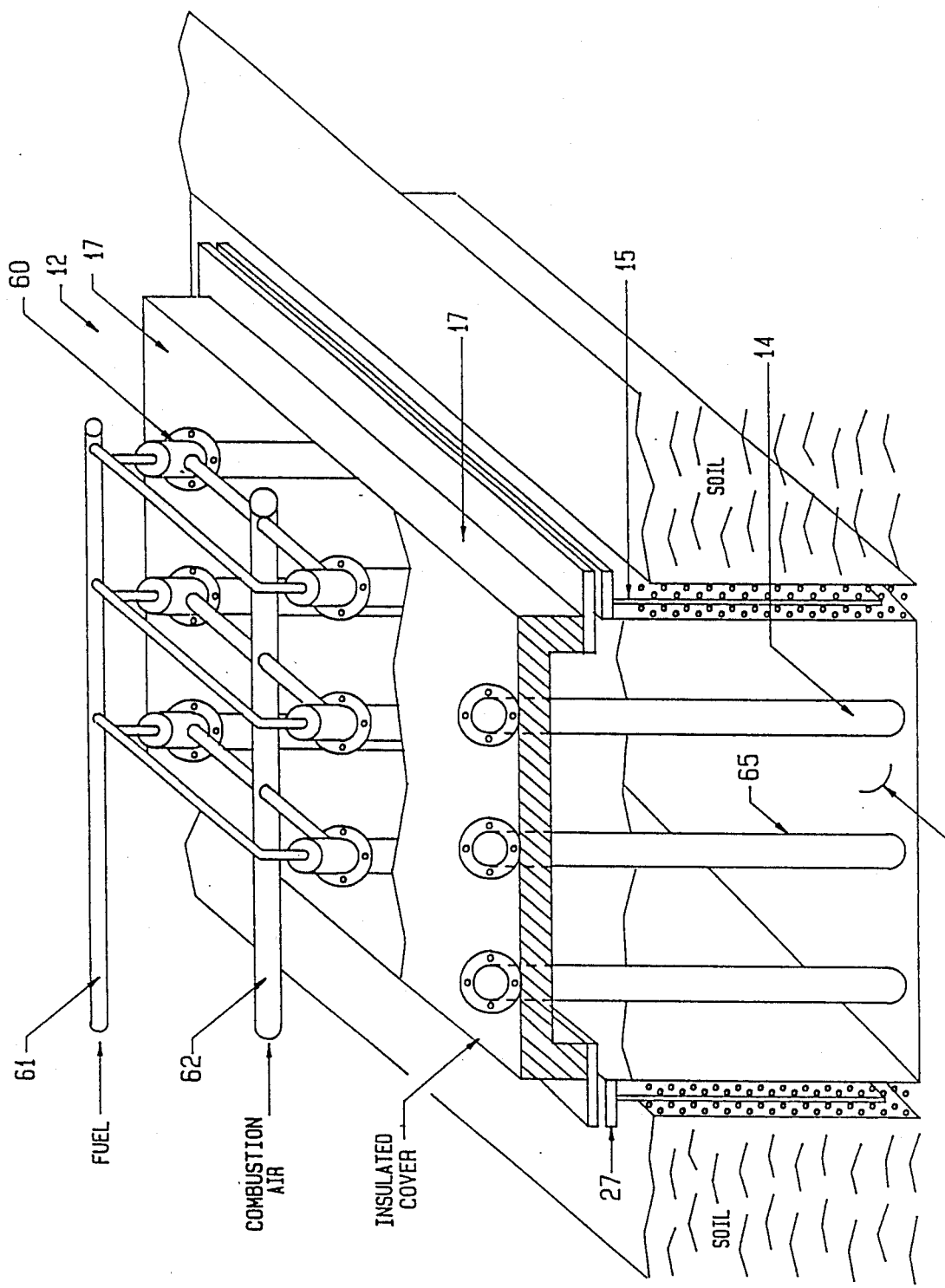
FIG. 1 is a cut-away, pictorial view showing the system applied to a portion of a contaminated site.
Figure 2:
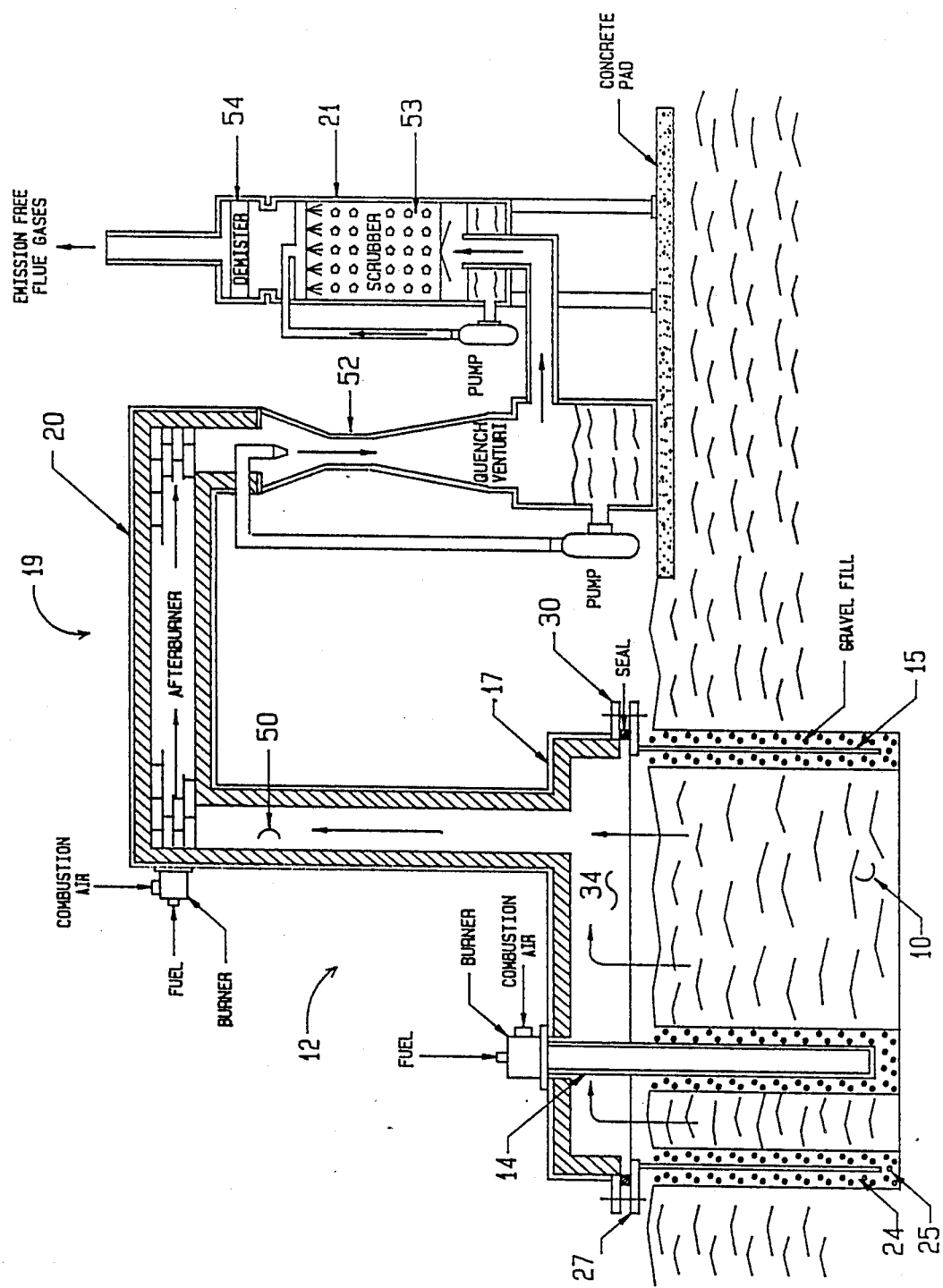
FIG. 2 is a schematic, cross-sectional elevation view of the system and a contaminated site.

Referring now to the drawings wherein the showings are for the purpose of illustrating the preferred embodiment of the invention only and not for the purpose of limiting the same, there is shown in FIGS. 1 and 2 a contaminated site 10 and a system 12 for an in situ thermal cleaning of site 10. Site 10 can be viewed as those types of sites which typically qualify as hazardous and/or toxic waste sites of the type covered by "Superfund" legislation. While generally, site 10 is comprised of contaminated soil with various rock, shale, boulders, etc., portions, it is contemplated that site 10 can also have buried therein containers of toxic and/or hazardous waste such as drummed waste or storage tanks and the like which might be buried under buildings on the site. Also, site 10 can comprise lagoons of pumpable or unpumpable sludge such as that which might be found on fuel oil sites or the tars from gas generating plants. As used in the specifications and in the claims hereof, "site" means any and all such applications.

System 12 essentially comprises a plurality of heat tubes 14 which extend into site 10 a fixed distance. The periphery of site 10 is bounded or enclosed by a barrier or perimeter wall 15 which extends into the soil of site 10 a fixed distance. A roof 17 sealingly secured to perimeter wall 15 extends above site 10 and caps site 10 to prevent communication between the atmosphere surrounding the site, i.e. ambient atmosphere, and the site. Thus, perimeter wall 15 and roof 17 essentially encapsulate site 10 to make site 10 a large batch or mass of soil which can be heated by heat tubes 14. Pollution control equipment generally designated by arrow 19 is in communication with roof 17 for treating the atmosphere of site 10 and which is contained or confined with an enclosed space extending above the site by roof 17. Pollution control equipment 19 comprises an afterburner 20 which incinerates volatile gases emitted from site 10 and related gas pollution control equipment 21 such as scrubbers and the like which treat the incinerated gases before exhausting the gases to atmosphere or environment. As noted above, the general concept or method is to encapsulate the site, heat the entire site in a controlled manner to distill or volatilize the contaminants within site 10, draw off the volatilized contaminants as gases which are then incinerated and subsequently treated by pollution control equipment before discharging same to the atmosphere. The basic components of the system are, for all intents and purposes and except as and to the extent noted herein, conventional and are readily available and known to those skilled in the art. Thus, except as and to the extent such components may have to be modified or altered to work within system 12, they will not be described in detail herein.

Figure 3:
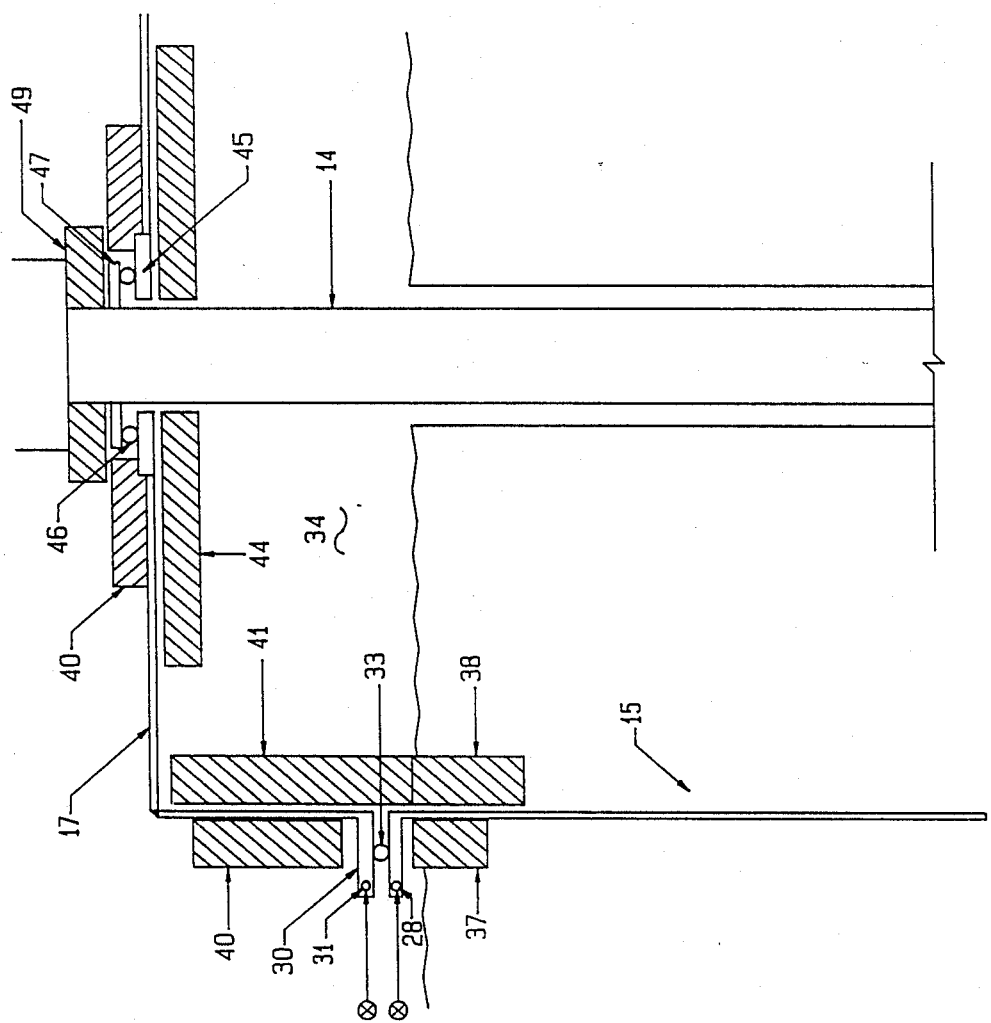
FIG. 3 is a schematic, cross-sectional elevation view showing a seal arrangement utilized in the system.

Referring now to FIGS. 2 and 3, as indicated above, it is fundamental that the site be encapsulated to permit it to be heated as a large batch and this is done by means of perimeter wall 15 and roof 17. In practice, a trench is dug about the periphery of the site and the depth of the trench will be equal to or greater than the depth tubes 14 extend into the soil of site 10 for reasons which will be hereafter explained. Perimeter wall 15 is essentially a thin metal member which is positioned within the perimeter trough 24 and supported or maintained in place by gravel 25 (or any suitable crushed particulate) which is back filled into perimeter trough 24. It is contemplated that perimeter wall 15 is comprised of various straight and curved modular sections which permit the sections to be joined together, such as by bolting one to the other, for assembly at the site. It is further contemplated that standard gauge, corrugated galvanized steel used in the construction of warehouse buildings, assembly plants and the like will suitably function as perimeter wall 15. Attached to and part of perimeter wall 15 is a flange 27 or a structure equivalent to a flange. Flange 27 is provided with a water jacket 28 or any similar conventional arrangement for keeping its temperature cool. In a not entirely dissimilar manner, roof 17 would be formed of relatively thin metal sections, i.e. modular straight and curved sections, which are bolted together and which essentially have at their perimeter a Z-shaped configuration such as shown in FIG. 3. Roof 17 likewise has a flange 30 (or a similar surface) formed at its base which may also be provided with a water jacket 31 for cooling, etc. Roof flange 30 is thus in confronting relationship with and coincident with perimeter flange 27 and a simple elastomer seal 33 is provided between flanges 27, 30 to seal roof 17 to perimeter wall 15. It should be appreciated that economic considerations dictate a modular construction of roof 17 and perimeter wall 15 using standard building gauge metal material and that while such metal is thin, gravel bed 25 and perimeter wall 15 will effectively function to maintain heat within site 10 and improve efficiency of the process while roof 17 will function to prevent communication of the ambient atmosphere with the atmosphere within an enclosure 34 defined by roof 17, although heat from roof 17 will be transmitted to atmosphere. Accordingly, it should be clear that because of the relatively thin sections used in the construction of roof 17 and perimeter wall 15, the thin sections will thermally distort when site 10 is heated into any one of a number of different configurations. It should also be clear that if the heat from site 10 is transmitted through the sections of roof 17 to roof flange 30 or perimeter wall 15 to perimeter barrier 27 (which surfaces have to be cooled to allow sealing of elastomer seal 33) there will be a thermal shock to the wall sections which will eventually rupture the wall sections. Accordingly, an insulating arrangement is shown in FIG. 3 to prevent rupture of the thin wall sections. With respect to perimeter wall 15, the sealing arrangement essentially comprises a block of cold insulating material 37 in line contact with the surface of perimeter wall 15 facing outside the site and cold insulating member 37 extends into the soil of site 10 for a predetermined distance. On the opposite side of perimeter wall 15 adjacent its adjacent perimeter flange 27 is a hot insulating block member 38. Preferably hot insulating block member 38 extends into the soil of site 10 a distance slightly longer than that of cold insulating member 37 and importantly is spaced slightly away from perimeter wall 15. Cold insulating member 37 thus serves as a support for the top portion of perimeter wall 15 permitting the remainder of the wall to thermally distort in any manner it sees fit and importantly, cold and hot insulating members 37, 38 allow a gradual temperature gradient to exist from seal 33 (cooled by water jacket 27) to the point where perimeter wall 15 exits hot and cold insulating members 37, 38. In this manner (i.e. thermal gradient), rupture due to thermal loading is prevented and seal 33 is not destroyed. Without this arrangement, heavier sections would have to be used in the constructions of system 10 and different, more complicated sealing arrangements would have to be employed. In connection with the description of cold and hot insulating members 37, 38, reference may be had to my prior U.S. Pat. No. 4,787,844 dated Nov. 29, 1988 and incorporated herein by reference which discloses a somewhat similar sealing concept for use in a high temperature, industrial furnace application. The concept disclosed in my prior patent is modified and extended in system 10.

Similarly, with respect to roof 17, a roof cold insulating member 40 and a roof hot insulating member 41 is utilized to provide cooling of the roof section from roof flange 30. Perimeter hot insulating member 38 and roof hot insulating member 41 can be combined for ease of installation.

Similarly, the sealing concept as discussed may be applied to the openings 45 in roof 17 for receiving heat tubes 14. Only one roof cold insulating block 40 and one roof hot insulating block 41 need be employed to seal heat tubes opening 45 by elastic seal 46. A sufficiently thick collar 47 affixed to heat tube 14 and including a sufficiently massive block of collar insulation 49 can be utilized as schematically shown to avoid the shock rupture concerns present in roof 17 and perimeter wall 15. Thus, a simple elastomer seal arrangement is disclosed which permits encapsulation of site 10.

Referring now to FIG. 2, roof 17 is provided with an opening which is in fluid communication with a passageway 50 which in turn is in communication with afterburner 20. A fan in roof enclosure 34, not shown, is provided to induce a draft so that the volatilized gases from site 10 can be drawn or pushed into passageway 50 for subsequent combustion by afterburner 20. Afterburner 20 is conventional in the trade and is not disclosed or discussed in greater detail herein. If desired, afterburner 20 could comprise the rich fume incinerator as disclosed in my prior U.S. Pat. No. 3,838,974. In the arrangement shown in FIG. 2, the incinerated gases leave afterburner 20 and are quenched in a conventional quench venturi 52 and are cooled before entering packed bed scrubber 53 which optionally may include a demister 54 before exiting as pollution free flue gas to ambient atmosphere.

Figure 4:
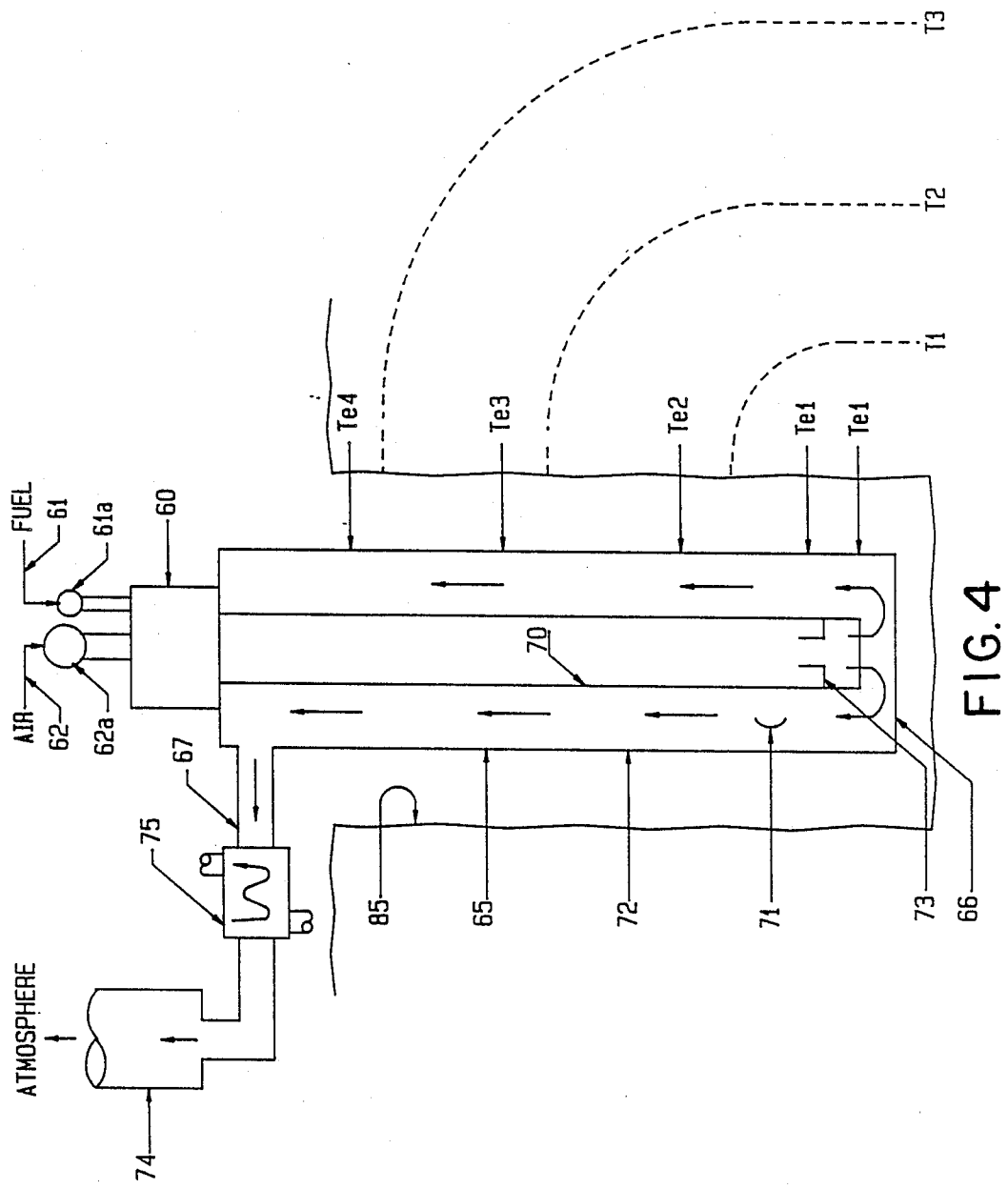
FIGS. 4 and 5 are cross-sectional schematic illustrations of two different radiant heating tubes which can be employed in the system and diagrammatically illustrating site heating patters resulting therefrom.
Figure 5:
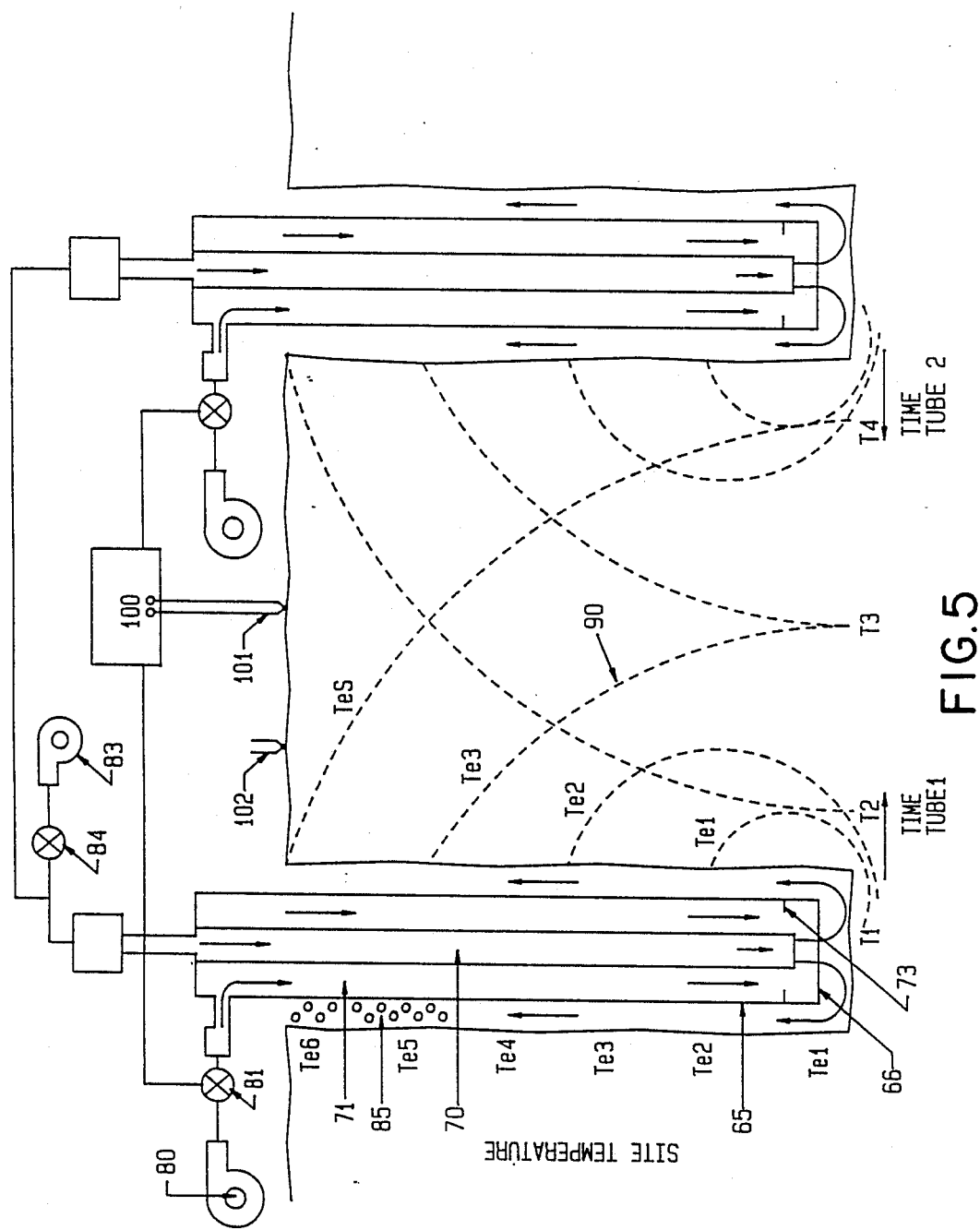

Referring next to FIGS. 1, 4 and 5, heating tubes 14 are somewhat similar to radiant tubes used in industrial heat treat furnaces and reference may be had to my U.S. Pat. No. 4,214,869 dated July 29, 1984 incorporated by reference herein, for a general description of such tubes along with particular improvement therein. System 12 is able to function with either one of two types of heating tube designs. The alternative embodiment is schematically illustrated in FIGS. 1 and 4 and more closely resembles a conventional radiant tube than that of the preferred embodiment illustrated in FIG. 5. In the alternative embodiment, heating tube 14 includes a burner 60 which is essentially mounted at the open end of heating tube 14 which projects above roof 17. As best shown in FIG. 1, a manifold arrangement can be easily adapted to plumb into burner 60 a combustible fuel at line 61 and combustion air at line 62. Each heat tube 14 can be appropriately valved by fuel valve 61a and air valve 62a to control the firing or the heat release from the products of combustion emanating from burner 60. Heat tube 14 includes an outer casing 65 which is closed at the end 66 which is inserted into the soil of site 10 and open at its end 67 which is above roof 17. Burner 60 seals open end 67. An inner open ended cylindrical firing tube 70 essentially positioned within outer casing 65 and aligned with burner 60 so that the air and fuel leaving burner 60 travel within and are contained within inner tube 70. The air and fuel are combusted within inner tube 70 and the products of combustion leave inner tube 70 and flow in the annular passage 71 formed between outer casing 65 and inner tube 70 to open end 67 of outer casing 65. In accordance with conventional burner practice, it is possible to control burner 60 by the velocities of the combustion air and gas so that combustion occurs only after the air and fuel have travelled a certain distance within inner tube 70. While it is possible and the invention will work if inner tube 70 were uniformly heated along its entire length, it is preferred, for reasons to be explained hereafter, to have combustion occur within inner tube 70 at distances spaced closer to closed end 66 of outer casing 65 then open end 67 of outer casing 65. This can be accomplished, for example, by simply placing an insert 73 within inner tube 70 which causes the fuel and air mixture to mix at insert 73 and then ignition means (not shown) can be provided to cause combustion at insert 73. It is also possible, in accordance with conventional practice, to simply vary the velocities and the swirl patterns of the fuel air emanating burner 60 to cause the combustible mixture capable of supporting combustion to occur at some point removed from open end 67 of outer casing 65. One particular advantage of the alternative embodiment of heater 14 shown in FIG. 4, is that the products of combustion in annular passageway 71 are clean and can be exhausted directly to atmosphere. Thus, in the embodiment of FIG. 4, annular passageway 71 adjacent outer casing open end 67 can be ported directly through a stack 74 to atmosphere and a heat exchanger 75 can be optionally provided to recover heat to improve efficiency. It should be noted that in radiant tubes used in the industrial heat treat art, the burners are operated to uniformly heat the tube extending into the furnace proper and the products of combustion are either exhausted outside the furnace or are returned back through the furnace through a separate return bend of the radiant tube.

The preferred embodiment of heat tube 14 is shown in FIG. 5 and reference numerals used to explain heat tube 14 in FIGS. 1 and 4 will be used to explain like parts and components of heat tube 14 shown in FIG. 5 where applicable. In heat tube 14 of FIG. 5, combustion air pressurized at combustion air blower 80 and regulated by combustion air valve 81 is plumbed directly into annular passageway 71 and a combustible fuel pressurized by fuel blower 83 and regulated by fuel valve 84 is plumbed directly into inner tube 70. Combustion air and fuel mix adjacent the soil end 66 of outer casing 65 which in the embodiment shown is open and not closed. Inserts 73 can be provided to assure the appropriate mixing and an ignitor, not shown, can also be supplied to assure combustion at outer casing end 66. As shown by the arrows in FIG. 5, the products of combustion then exit heat tube through a bed 85 of gravel or similar particulates. (As done for perimeter wall 15, a hole is drilled, tube 14 is inserted in the hole and back filled with gravel to establish bed 85.) In the preferred embodiment of heat tube 14 shown in FIG. 5, the products of combustion principally exit bed 85 but also tend to penetrate the soil in site 10 and establish to some extent, depending upon the density of site 10, a convective as opposed to a conductive heat transfer relationship. Should site 10 be a heavy, non-pumpable slurry or lagoon, the convective heat transfer aspect of system 12 becomes significant and materially decreases the cycle time. A trade-off, however, resides in the fact that in the preferred embodiment of FIG. 5, the products of combustion are exhausted through afterburner 20, whereas in the alternative embodiment, heat tube 14 of FIG. 4 afterburner 20 operates more economically because it incinerates only the vaporized contaminants. Accordingly, if the mass density of site 10 is high, heater 14 shown in FIG. 4 would tend to be favored whereas the convective/conductive arrangement of FIG. 5 is preferred for lower density sites.

Considering sites 10 are normally comprised of contaminated soil, heat is transferred by conduction and radiation to gravel bed 85 and from there by conduction into the soil of site 10. Normally, thermal conductivity of soils is very low and heat transfer is slow. Further, heat transfer by conduction is a function of the square of the distance between adjacent heat tubes 14 and this is diagrammatically shown by the lines 90 drawn in FIGS. 4 and 5. More particularly, because combustion is principally occurring for heat tubes 14 of both FIGS. 4 and 5 near the bottom of heat tube 14 the highest temperature or hottest spot when the process is first started occurs at the area designated $T_E1$, the next highest temperature at area $T_E2$, etc., until the lowest heat occurs at $T_ES$ or surface. As a function of time, the propagation of the heat will assume the pattern shown by the dashed lines shown in FIG. 5 for $T_1$, $T_2$, $T_3$ and $T_4$. It should also be noted that the heat patterns are occurring downward into the soil of site 10 as well as upwards and this is obviously considered when determining the length of heat tubes 14 vis-a-vis site contamination depth. As shown, the surface of the soil midway between adjacent heat tubes 14 is the point, last in time to be heated by system 10. This relationship then permits a very simple and effective mechanism and method for controlling the entire process and that is to simply sense the midpoint temperature at the surface of the site between adjacent heat tubes and when that temperature reaches the desired value, by definition, all the soil in site 10 beneath that point is at that temperature, i.e. homogenized temperature. Thus, a conventional type microprocessor 100 can sense the temperature at midpoint thermocouple 101 (and optionally temperature at other thermocouple points 102) and appropriately regulate valves 81 and 84 be control the firing or the heat input for any individual tube 14.

Figure 6:
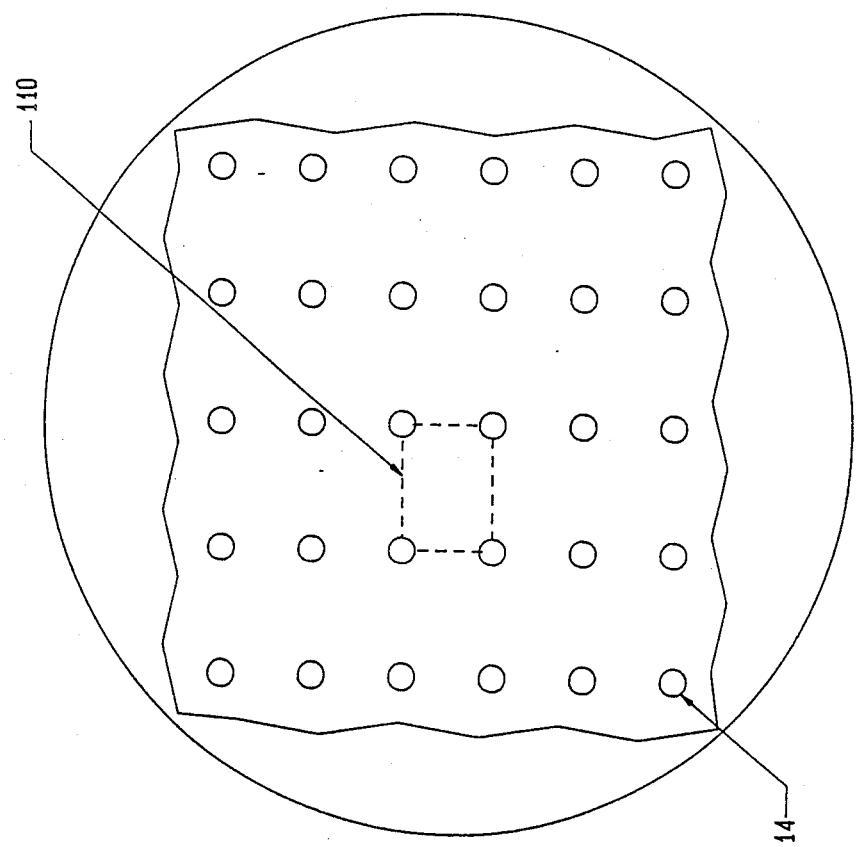
FIGS. 6 and 7 illustrate two different geometric patterns for locating the heat tubes in a site.
Figure 7:
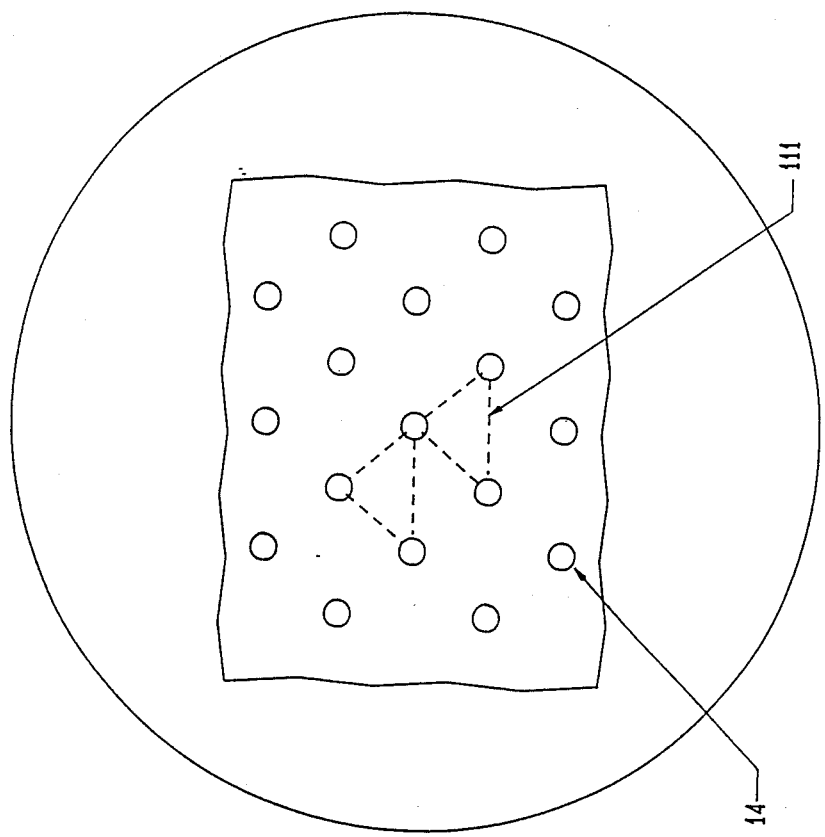

Tubes 14 are arranged in a regular geometric pattern as shown in FIGS. 6 and 7. The geometric pattern is comprised of regularly repeating arrays which for FIG. 6 is shown to comprise a rectangular array 110 and which for FIG. 7 is shown to comprise a triangular array 111. In each array 110, 111, heating tubes 14 are spaced so that each tube is equally spaced from and adjacent to another tube 14 to permit the heat distribution pattern described with reference to FIG. 5 to occur. This effects batch heating of the entire site 10. More importantly, as noted above, it is possible that within site 10 drummed waste or tanks or the like containing volatile materials are buried. In the system disclosed, heat is very slowly applied to site 10 and the soil within site 10 (or the sludge in the lagoon) in effect surrounds or packs the contaminants within the site in such a manner that pyrolysis (as opposed to incineration) occurs. That is, the soil is preventing oxygen from mixing with the contaminants so that the contaminants are heated in the absence of oxygen, i.e. pyrolysis. It is well known in the art that certain reactive wastes can only be thermally "cleansed" by pyrolysis as opposed to incineration. It is also well known in the pyrolysis art that if heat is imparted to the waste at a very high initial rate, the reaction can run out of control. Since system 12 heats the site very slowly, this is unlikely to occur. However, in system 12, should, for whatever reason, some buried drummed waste begin to rapidly react, thermocouples 101, 102 will sense that reaction at that portion of site 10 and controller 100 will individually regulate the appropriate heat tubes 14 to keep the reaction under control and assure that the entire site is brought up to the appropriate temperature in a uniform manner. This is somewhat critical to the functioning of system 12 and occurs only because of the heat pattern generate which permits a progressive distribution of the heat to effect a batch heating of the entire site. That is, it is possible to reason by analogy that the entire site 10 has become the equivalent of a load of industrial parts (i.e. a batch load), in an industrial heat treat furnace and that when the temperature of the parts at a certain reference location in the furnace equals the desired heat treat temperature the entire batch by principles of heat conduction and radiation are, by definition, at that temperature.

For purposes of providing some definition to the parameters of system 12 disclosed herein and generally speaking the site 10 will be heated to temperatures varying anywhere from 600° F. to 1200° F.; tube diameter will be anywhere from 8 to 16 inches; the gravel bed thickness will be anywhere from 3 to 6 inches; the gauge thickness will be anywhere from 3/64 to 3/16 inches; the length of heating tubes will be anywhere from 10 to 50 feet. Sites having a cubic volume of 10,000 to 500,000 cubic feet will be heated from 20 to 80 days at total fuel costs, not counting recovery, of anywhere from 0.5 to 1.5 MM Btu/ton. As a reference point, if sites having equivalent cubic volumes were thermally cleansed by digging up the soil and trucking the soil to a rotary kiln for incineration of the contaminants, the fuel consumption would be anywhere from 2.0 to 10 MM Btu/ton. This last set of figures is for relatively dry soil, wet soil will require proportionally higher fuel inputs to provide heat for evaporation of water and heating of water vapor to exhaust temperature.

The invention has been described with reference to a preferred embodiment. Obviously, alterations and modifications will occur t others upon reading and understanding the specifications. It is my intention to include all such modifications and alterations insofar as they come within the scope of the invention.

Having thus defined the invention, I claim:

1. An in the ground, in situ system for thermally cleaning contaminated soil, sludge and the like from a site designated as a hazardous and/or toxic waste site without significantly disturbing the site comprising:

(a) thermal barrier means extending into the soil at the site and about the perimeter of the site for a predetermined depth to prevent substantial heat exchange with the soil adjacent to the site;

(b) roof barrier means extending above the site preventing exposure of the site to the atmosphere and including sealing means to positively seal said roof means with said thermal barrier means to sealingly encapsulate said site;

(c) means for heating the soil at the site to a temperature whereat the contaminants in the soil are volatilized;

(d) means associated with said roof barrier means for collecting and incinerating said volatilized contaminants as they leave the soil at the site; and (e) said means for heating including a plurality of heat type tubes extending into the soil to a predetermined depth at said site and spaced apart from one another at predetermined distances and burner means mixing combustion air and a combustible gas for heating said tubes so that heat from products of combustion will indirectly heat the soil and the like at said site to volatilize the contaminants therein without substantially disturbing the site.

2. The system of claim 1 wherein said tubular member includes an outer casing having an open end generally above the soil of said site and an open ended inner tubular member concentric with and inside said outer casing to define an elongated passageway therebetween.

3. The system of claim 2 wherein said outer casing includes a closed end opposite said open end and within said soil and said products of combustion exit said inner tubular member adjacent said closed end of said casing and exit said casing adjacent said open end through said elongated passageway.

4. The system of claim 2 wherein each of said tubular members is positioned within a hole prepared in the soil of said site and a bed of solid particulates is positioned between the periphery of each hole and said tubular member therein for providing a path for escape of some of said volatiles.

5. The system of claim 4 wherein said casing is open at both ends and at least a portion of said products of combustion pass through said bed of particulates.

6. The system of claim 5 wherein a source of combustion air under pressure is in fluid communication with said elongated passageway, a source of combustible gas is in fluid communication with said inner tubular means and ignition means ignite and combust said combustion air with said combustible gas adjacent said open end of said outer casing for initially heating the soil of said site adjacent said open end of said outer casing.

7. The system of claim 2 further including temperature sensing means for sensing the temperature adjacent to the surface of said soil at said site and means for controlling the heating of said tubes in response to the temperature sensed by said temperature sensing means.

8. The system of claim 2 wherein said perimeter sealing means includes an elongated relatively thin metal member extending into said soil a fixed distance and shaped to surround a peripheral portion of said site, said member having a flanged end extending above said soil a fixed distance, first elastomer sealing means including an elastomer seal affixed to said flanged end for sealing said flanged end with said roof means.

9. The system of claim 8 wherein said first sealing means further includes cooling means associated with said flange end to maintain said flanged end at ambient temperatures adjacent said elastomer seal, a cold side insulating member in line contact with the side of said metal member facing away from said site and extending from said flanged end into said soil a fixed distance, a hot side insulating member extending generally adjacent said flanged end facing said site and into said soil a predetermined distance but spaced a slight distance away from said metal member whereby said metal member can thermally distort in response to heat from said site over its length which extends beyond said cold insulating member while a temperature gradient exists in said metal member over its length between said hot and cold insulating members to prevent rupture thereof.

10. The system of claim 9 wherein said roof means includes a relatively thin base member extending above said soil and having a roof flanged end confronting said flanged end of said metal perimeter member; said roof flanged end in contact with said elastomer seal; a roof cold side insulating member in line contact with said base member on its surface facing away from said site and extending from said roof flanged end a predetermined distance, and a roof hot side insulating member generally adjacent to but spaced away from the surface of said roof flanged end facing said site and extending a predetermined distance from said roof flanged end away from said soil whereby said roof base can thermally distort in response to heat from said site over its length beyond said roof cold insulating member while a temperature gradient exists in said roof base over its length between said hot and cold insulating members to prevent rupture thereof.

11. The system of claim 10 wherein one hot insulating member forms said hot side insulating member for said perimeter metal member and said hot side insulating member of said roof base member.

12. The system of claim 1 wherein said radiant tubes are arranged in a geometric pattern throughout said site such that the distance between axial centers of any two adjacent tubes are approximately equal.

13. The system of claim 12 wherein said geometric pattern is triangular such that an equilateral triangle can be drawn through the axial centers of three tubes, any one of which is adjacent the other two.

14. The system of claim 12 wherein said geometric pattern is rectangular such that a square can be drawn through the axial centers of four tubes, any one of which is adjacent and perpendicular to two of the other four tubes.

15. The system of claim 4 further including means associated with said roof means for incinerating said contaminants in their gaseous form and pollution treating means downstream of said incinerating means for purifying said incinerated gases before discharging said incinerated gases to the atmosphere.

16. The system of claim 15 wherein said means for incinerating also receives said products of combustion.

17. The system of claim 3 further including means associated with said roof means for incinerating said contaminants in their gaseous form and pollution treating means downstream of said incinerating means for purifying said incinerated gases before discharging said incinerated gases to the atmosphere.

18. The system of claim 17 further including means associated with said casing for recovering spent heat from said products of combustion separately and apart from said incinerating means.

19. The system of claim 18 wherein said products of combustion are discharged directly into said atmosphere without passing through said pollution treating means.

20. The system of claim 12 further including means to control the temperature of the volumetric portion of the site encompassed within any one geometric pattern independently of the other geometric patterns.

21. The system of claim 20 wherein said control means includes a thermocouple adjacent the surface of said site within said geometric pattern.

22. An in the ground, in situ system for thermally volatilizing the toxic and/or hazardous waster substances contained within a site without significantly disturbing the physical condition of said site comprising:
  (a) means extending within said site about its periphery and above said site to sealingly encapsulate said site from the atmosphere;
  (b) a plurality of tubes extending into said site for a fixed depth at which the site is to be minimally cleansed and spaced from one another in a regularly repeating geometric array;
  (c) means for heating said tubes from the bottom up to pyrolyze said toxic and/or hazardous substances; and
  (d) means for incinerating said volatiles after they exit from the surface of said site.

23. An in situ, in the ground method for thermally cleansing a site designated as a toxic and/or hazardous waste site without substantially disturbing said site comprising the steps of:
  (a) encapsulating said site by inserting about the perimeter of the site a thermal shield extending into the site a fixed distance and sealing a roof structure to said shield;
  (b) providing a plurality of tubes;
  (c) inserting said tubes within said encapsulated site at generally regularly repeating intervals until said tubes permeate the site to be cleansed;
  (d) heating said tubes from the bottom up until the contaminants in said site are volatilized; and
  (e) incinerating said volatilized contaminants after they leave the surface of said site.

24. The method of claim 23 further including the step of controlling the heating step by sensing the temperature of the site adjacent to its surface and continuing the heating step until the surface site temperature sensed ha uniformly reached a predetermined temperature.

25. The method of claim 24 further including the step of individually controlling the temperature of each tube.

26. The method of claim 23 wherein said contaminants are pyrolyzed when heated by said tubes.

* * * * *